United States Patent
Huang

(10) Patent No.: US 9,256,034 B2
(45) Date of Patent: Feb. 9, 2016

(54) OPTICAL CONNECTOR HAVING HIGH COUPLING PRECISION

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 13/974,028

(22) Filed: Aug. 22, 2013

(65) Prior Publication Data

US 2014/0363132 A1    Dec. 11, 2014

(30) Foreign Application Priority Data

Jun. 7, 2013    (TW) .............................. 102120377 A

(51) Int. Cl.
*G02B 6/36*    (2006.01)
*G02B 6/38*    (2006.01)

(52) U.S. Cl.
CPC ............ *G02B 6/3839* (2013.01); *G02B 6/3853* (2013.01); *G02B 6/3858* (2013.01); *G02B 6/389* (2013.01)

(58) Field of Classification Search
CPC ...... G02B 6/32; G02B 6/3853; G02B 6/3857; G02B 6/3858; G02B 6/3873; G02B 6/3882; G02B 3/9809
USPC .................. 385/53, 54, 56, 59–66, 81, 89, 93
See application file for complete search history.

(56) References Cited

U.S. PATENT DOCUMENTS

| | | |
|---|---|---|
| 8,016,609 B1 * | 9/2011 | Lin ................................ 439/483 |
| 2011/0091161 A1 * | 4/2011 | He et al. ........................... 385/74 |
| 2011/0142400 A1 * | 6/2011 | Little et al. ...................... 385/77 |
| 2012/0099821 A1 * | 4/2012 | Lin et al. .......................... 385/74 |
| 2014/0064670 A1 * | 3/2014 | Lin ................................... 385/79 |
| 2014/0270626 A1 * | 9/2014 | Isenhour et al. ................. 385/14 |

* cited by examiner

*Primary Examiner* — Kaveh Kianni
*Assistant Examiner* — Hung Lam
(74) *Attorney, Agent, or Firm* — Novak Druce Connolly Bove + Quigg LLP

(57) ABSTRACT

An optical connector includes a first optical-electric coupling element, a second optical-electric coupling element, and a fixing device. The first optical-electric coupling element defines a first cavity and a second cavity. The second cavity includes two opposite first sidewalls. Each first sidewall defines a locating cutout. The second optical-electric coupling element is received in the second cavity, and defines a third cavity. The third cavity includes two opposite second sidewalls. Each second sidewall defines a through hole. The fixing device includes two elastic deformable portions conforming the two through holes, and a number receiving holes each for receiving a optical fiber. The fixing device is received in the through holes, with the elastic deformable portion resisting against an internal sidewall of the locating cutout, to firmly lock the second optical-electric coupling element into the second cavity of the first optical-electric coupling element.

9 Claims, 3 Drawing Sheets

OPTICAL CONNECTOR HAVING HIGH COUPLING PRECISION

BACKGROUND

1. Technical Field

The present disclosure relates to optical connectors, and particularly to an optical connector which has a high coupling precision.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode enter the first optical transmission assembly, and are transmitted through the second optical transmission assembly to the photo diode, and finally can be converted into electrical signals by the photo diode.

The first optical transmission assembly includes a plurality of first coupling lenses and the second optical assembly includes a plurality of second coupling lenses for coupling the first coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
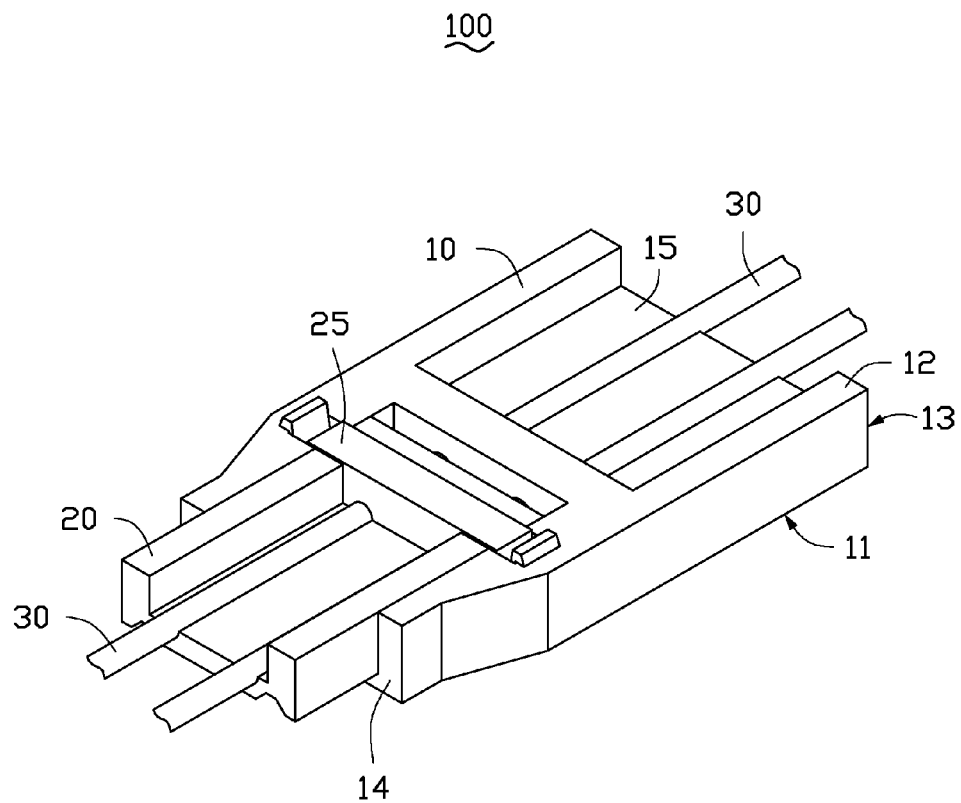
FIG. 1 is an assembled, isometric view of an optical connector, according to an exemplary embodiment.
Figure 2:
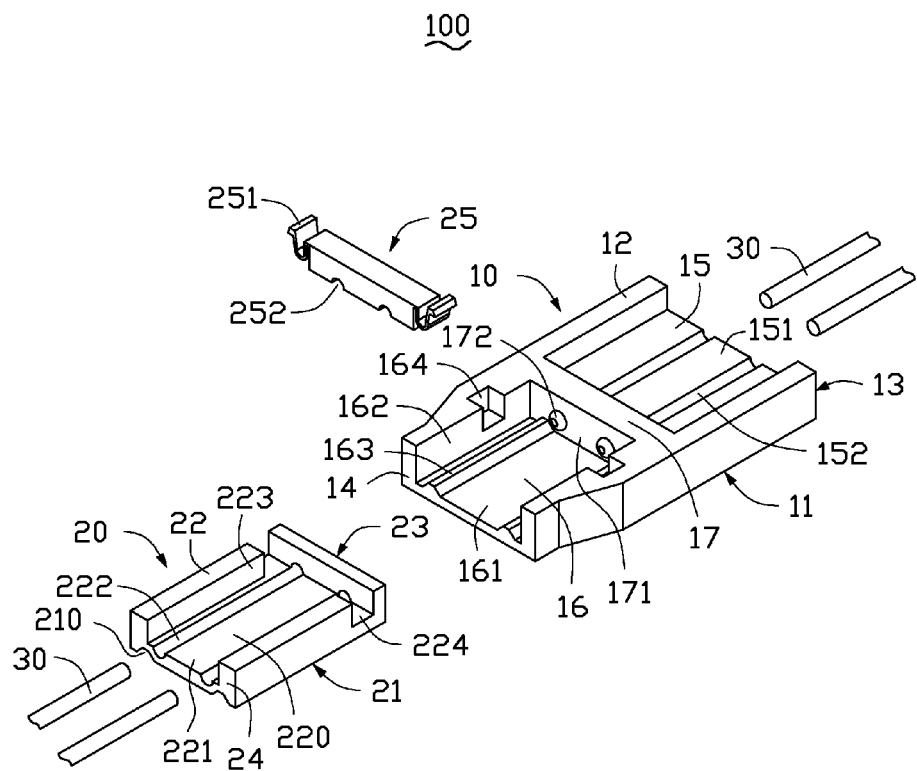
FIG. 2 is an exploded, isometric view of the optical connector of FIG. 1.
Figure 3:
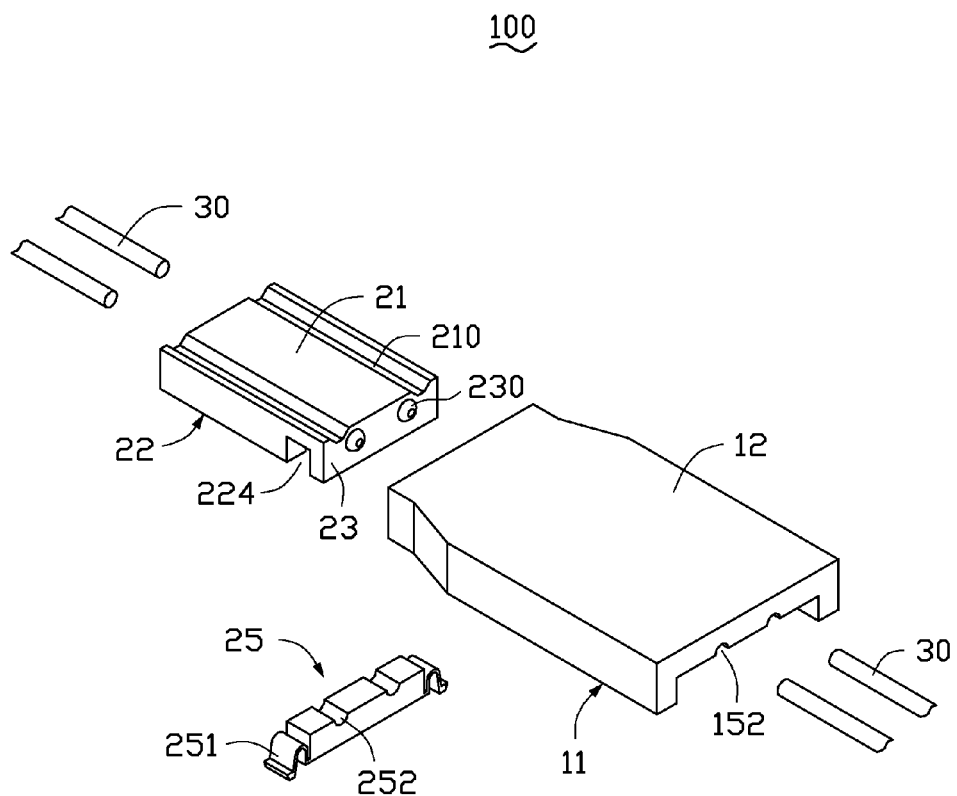
FIG. 3 is similar to FIG. 2, but viewed from another angle.

FIGS. 1-3 show an optical connector 100, according to an embodiment. The optical connector 100 includes a first optical-electric coupling element 10, a second optical-electric coupling element 20, and a fixing device 25 for locking the second optical-electric coupling element 20 into the first optical-electric coupling element 10, and four optical fibers 30 received in the first optical-electric coupling element 10 and the second optical-electric coupling element 20.

The first optical-electric coupling element 10 is made of a transparent material, such as glass or plastic, and includes a first lower surface 11, a first upper surface 12 facing away from the first lower surface 11, a first side surface 13 and a second side surface 14 facing away from the first side surface 13. The first upper surface 12 is substantially parallel with the first lower surface 11. The first side surface 13 is substantially parallel with the second side surface 14. The first side surface 13 substantially perpendicularly connects the first upper surface 12 to the first lower surface 11. The second side surface 14 also substantially perpendicularly connects the first upper surface 12 to the first lower surface 11.

The first upper surface 12 defines a first cavity 15 and a second cavity 16. The first cavity 15 runs through the first side surface 13. The second cavity 16 runs through the second side surface 14. The first optical-electric coupling element 10 also includes a rib 17 formed between the first cavity 15 and the second cavity 16. The rib 17 includes a third side surface 171 in the second cavity 16. The first optical-electric coupling element 10 also includes two first coupling lenses 172 formed on the third side surface 171. In the embodiment, all of the first coupling lenses 172 are convex lenses and are integrally formed with the first optical-electric coupling element 10.

The first cavity 15 includes a first bottom surface 151. The first bottom surface 151 defines two first receiving holes 152 each aligning with a first coupling lens 17. An axis of the first coupling lens 172 is parallel with a lengthwise direction of the first receiving hole 152. Each first receiving hole 152 receives an optical fiber 30. In the embodiment, two optical fibers 30 are received in the two first receiving holes 152 via an adhesive.

The second cavity 16 includes a second bottom surface 161 and two opposite first sidewalls 162. The first optical-electric coupling element 10 also includes two position posts 163 substantially perpendicularly extending from the second bottom surface 161. Each first sidewall 162 defines a locating cutout 164 running through the first upper surface 12 and communicating with the second cavity 162.

The second optical-electric coupling element 20 is also made of a transparent material, and includes a second lower surface 21, a second upper surface 22 facing away from the second lower surface 21, a fourth side surface 23 facing the third side surface 171, and a fifth side surface 24 facing away from the fourth side surface 23. The second upper surface 22 is substantially parallel with the second lower surface 21. The fourth side surface 23 is substantially parallel with the fifth side surface 24. The fourth side surface 23 perpendicularly connects the second upper surface 22 to the second lower surface 21. The fifth side surface 24 also substantially perpendicularly connects the second upper surface 22 to the second lower surface 21.

The second lower surface 21 defines two position holes 210 matching with the position posts 163.

The second optical-electric coupling element 20 also includes two second coupling lenses 230 formed on the fourth side surface 23. In the embodiment, all of the second coupling lenses 230 are convex lenses and are integrally formed with the second optical-electric coupling element 20. Each second coupling lens 230 aligns with a first coupling lens 172.

The second upper surface 22 defines a third cavity 220. The third cavity 220 runs through the fifth side surface 24. The third cavity 220 includes a third bottom surface 221. The third bottom surface 221 defines two second receiving holes 222 each aligning with a second coupling lens 230. An axis of the second coupling lens 230 is parallel with a lengthwise direction of the second receiving hole 222. The two second receiving holes 222 receive the other two optical fibers 30. In the embodiment, each optical fiber 30 is received in a second receiving hole 222 also via an adhesive.

The third cavity 220 includes two opposite second sidewalls 223. Each second sidewall 223 defines a through hole 224 running through the second upper surface 22. The through holes 224 communicate with the third cavity 220.

A shape and a size of the second optical-electric coupling element 20 respectively conform a shape and a size of the second cavity 16. The second optical-electric coupling element 20 is fixedly received in the second cavity 16 by the fixing device 25. In the embodiment, the fixing device 25 is stripped and includes two elastic deformable portions 251 conforming the two through holes 224. The fixing device 25 defines two receiving holes 252. A shape and a size of the receiving hole 252 conforms with the optical fiber 30.

When assembling, first, the second optical-electric coupling element 20 is received in the second cavity 16. Each first coupling lens 172 aligns with a second coupling lens 230. Each through hole 224 aligns with the locating cutout 164. Then, two optical fibers 30 are received in the second receiving holes 222. The fixing device 25 is received in the through holes 224, with the elastic deformable portion 251 resisting against an internal sidewall of the locating cutout 164, as such, the position posts 163 are inserted into the position holes 210 as a pinch fit to firmly attach the second optical-electric coupling element 20 to the first optical-electric coupling element 10.

In other embodiments, the numbers of the first coupling lenses 172, the second coupling lenses 230 and the optical fibers 30 can be changed depending on need, and the number of the receiving holes 252 will change correspondingly. The numbers of the position holes 210 and the position posts 163 can also be changed depending on need.

In other embodiments, both the position holes 210 and the position posts 163 can be omitted.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a first optical-electric coupling element defining a first cavity and a second cavity, the second cavity comprising two opposite first sidewalls, each first sidewall defining a locating cutout communicating with the second cavity;
   a second optical-electric coupling element received in the second cavity, and defining a third cavity, the third cavity comprising two opposite second sidewalls, each second sidewall defining a through hole communicating with the third cavity, each of the through holes aligning with one corresponding locating cutout; and
   a fixing device comprising two elastic deformable portions conforming the two through holes, the fixing device received in the through holes, with each of the elastic deformable portions resisting against an internal sidewall of each locating cutout, to firmly lock the second optical-electric coupling element into the second cavity of the first optical-electric coupling element; and
   a plurality of optical fibers, wherein the first cavity comprises a first bottom surface, the first bottom surface defines a plurality of first receiving holes, the third cavity comprised a third bottom surface, the third bottom surface defines a plurality of second receiving holes, each optical fiber is received in a respective one of the first receiving holes and the second receiving holes;
   wherein the fixing device defines a plurality receiving holes, each receiving hole is configured to receive a respective one of the optical fibers received in the third cavity.

2. The optical connector of claim 1, wherein the first optical-electric coupling element comprises a first lower surface, a first upper surface facing away from the first lower surface, a first side surface and a second side surface facing away from the first side surface, the first cavity is defined in the first upper surface and runs through the first side surface, the second cavity is also defined in the first upper surface and runs through the second side surface, the locating cutout runs through the first upper surface.

3. The optical connector of claim 2, wherein the first upper surface is substantially parallel with the first lower surface, the first side surface is substantially parallel with the second side surface, the first side surface substantially perpendicularly connects the first upper surface to the first lower surface, the second side surface also substantially perpendicularly connects the first upper surface to the first lower surface.

4. The optical connector of claim 2, wherein the second optical-electric coupling element comprises a second upper surface, the third cavity is defined in the second upper surface.

5. The optical connector of claim 4, wherein the second cavity comprises a second bottom surface, the first optical-electric coupling element comprises a plurality of position posts substantially perpendicularly extending from the second bottom surface, the second optical-electric coupling element comprises a second lower surface facing away from the second upper surface, the second lower surface defines a plurality of position holes, and the position posts are inserted into the position holes.

6. The optical connector of claim 1, wherein the first optical-electric coupling element comprises a rib formed between the first cavity and the second cavity, the rib comprises a third side surface in the second cavity, the first optical-electric coupling element comprises a plurality of first coupling lenses formed on the third side surface, each first coupling lens aligns with a respective one of the optical fibers received in the first cavity.

7. The optical connector of claim 6, wherein the first optical-electric coupling element is made of a transparent material, all of the first coupling lenses are convex lenses and are integrally formed with the first optical-electric coupling element.

8. The optical connector of claim 6, wherein the second optical-electric coupling element comprising a fourth side surface facing the third side surface and a fifth side surface facing away from the fourth side surface, the third cavity runs through the fifth side surface, the second optical-electric coupling element comprises a plurality of second coupling lenses formed on the fourth side surface, each second coupling lens aligns with a respective one of the first coupling lenses, and aligns with a respective one of the second receiving holes.

9. The optical connector of claim 8, wherein the second optical-electric coupling element is made of a transparent material, all of the second coupling lenses are convex lenses and are integrally formed with the second optical-electric coupling element.

* * * * *